United States Patent
Gunnarsson et al.

(10) Patent No.: US 8,934,412 B2
(45) Date of Patent: Jan. 13, 2015

(54) BASE STATION SELF-OPTIMIZATION

(75) Inventors: Fredrik Gunnarsson, Linköping (SE); Mehdi Amirijoo, Linköping (SE); Pål Frenger, Linköping (SE); Johan Moe, Mantorp (SE); Kristina Zetterberg, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 204 days.

(21) Appl. No.: 13/392,604

(22) PCT Filed: Sep. 9, 2009

(86) PCT No.: PCT/SE2009/051005
§ 371 (c)(1),
(2), (4) Date: Feb. 27, 2012

(87) PCT Pub. No.: WO2011/031194
PCT Pub. Date: Mar. 17, 2011

(65) Prior Publication Data
US 2012/0163238 A1    Jun. 28, 2012

(51) Int. Cl.
*H04W 16/24* (2009.01)
*H04W 16/08* (2009.01)
*H04W 24/02* (2009.01)
*H04W 92/20* (2009.01)

(52) U.S. Cl.
CPC .............. *H04W 16/08* (2013.01); *H04W 24/02* (2013.01); *H04W 92/20* (2013.01)

USPC .................... 370/328; 370/401; 455/446

(58) Field of Classification Search
None
See application file for complete search history.

(56) References Cited

U.S. PATENT DOCUMENTS

| | | | |
|---|---|---|---|
| 2003/0171132 A1* | 9/2003 | Ho et al. ..................... | 455/522 |
| 2006/0234714 A1 | 10/2006 | Pollini et al. | |
| 2010/0061343 A1* | 3/2010 | Kazmi et al. ................ | 370/332 |
| 2010/0075682 A1* | 3/2010 | del Rio-Romero et al. .. | 455/439 |
| 2010/0203881 A1* | 8/2010 | del Rio Romero et al. ... | 455/423 |
| 2010/0227603 A1* | 9/2010 | Gupta et al. ................. | 455/418 |
| 2011/0070911 A1* | 3/2011 | Zhang et al. ................ | 455/509 |
| 2011/0223918 A1* | 9/2011 | Dahlen et al. ............... | 455/436 |
| 2011/0255514 A1* | 10/2011 | Olofsson et al. ............ | 370/331 |
| 2012/0289284 A1* | 11/2012 | Kuningas .................... | 455/525 |

FOREIGN PATENT DOCUMENTS

| | | |
|---|---|---|
| EP | 1643783 A1 | 4/2006 |
| WO | 0028758 | 5/2000 |
| WO | 2007063426 A2 | 6/2007 |
| WO | 2008090049 A1 | 7/2008 |

* cited by examiner

Primary Examiner — Duc Duong
(74) Attorney, Agent, or Firm — Murphy Bilak & Homiller, PLLC

(57) ABSTRACT

In a cellular radio system a message indicating a change of cell size can be transmitted to a number of affected cells, in particular, neighboring cells. The affected cells receiving such a message can be adapted to use the information in the message when determining self-optimization parameters used for control purposes. Hereby, better response times can be achieved without reducing noise sensitivity.

11 Claims, 7 Drawing Sheets

BASE STATION SELF-OPTIMIZATION

TECHNICAL FIELD

The present invention relates to a method and an apparatus for controlling update of parameters related to self-optimization in a cellular radio system.

BACKGROUND

The third generation partnership project (3GPP) is currently working on standardization the next generation of mobile communication system denoted Long Term Evolution (LTE). The architecture of the LTE system is shown in FIG. 1. In FIG. 1 the logical interfaces (S1) between the evolved Node Bs (eNBs) and the Mobility Management Entities (MME)/Serving Gateway (S-GW) and the interfaces (X2) between the eNBs are shown.

In LTE the downlink is based on orthogonal frequency division multiplexing (OFDM) while the uplink is based on a single carrier modulation method known as discrete Fourier transform spread OFDM (DFT-S-OFDM), see 3GPP TR 36.300, Evolved Universal Terrestrial Radio Access (E-UTRA) and Evolved Universal Terrestrial Radio Access (E-UTRAN); Overall description; Stage 2, V8.2.0.

In LTE distributed self-optimization mechanisms are provided. The mechanisms partly aim at adapting parameters to the cell size by observing cell performance via User Equipment (UE) and eNB measurements. Some existing mechanisms are briefly described below.

Load Balancing

Load balancing can be separated into short term (local) and long term (global), where the former aims at compensating for short term traffic changes, and the latter for more permanent load differences between cells. Short term load balancing can be aware of the long term load balancing and vice versa.

Typically, long term load balancing is closely related to or equivalent to centralized cell size changes. This can be accomplished by adjusting the antenna orientation, or the pilot signal (known as reference signal in LTE) power upon which cell selection is based. It is also possible to specify cell specific offsets considered in the cell selection procedure as a soft means to adjust the cell size. A centralized long term cell size update can preferably be directly incorporated into the short term load balancing, which aims at adjusting short term cell sizes to balance the traffic between cells, for example by adjusting cell selection offsets, or by moving specific user links between cells.

If the cell size of a neighbour cell to a considered cell is changed, then distributed load balancing in the considered cell is affected. Below some exemplifying size-dependent parameters are discussed in the following subsections. The cell size can be determined by the coverage of a service corresponding to a minimum quality of service level. With appropriately configured cells, this is about the same coverage as the reference signal (pilot signal) and the broadcast information (e.g. system information). Furthermore, the cell size can also be determined by signal round-trip time limitations.

Automatic Neighbour Cell Relations

Each cell in the network is identified by a globally unique identity GID, and a locally unique physical cell identity PCID. The former is a unique bit string signalled in the system information, while the latter is an integer (0-503 in LTE) associated to a physical reference signal sequence which the mobile can use to identify a cell on the physical layer. When a mobile station discovers a candidate cell it reports PCID of the cell to its serving cell. If this PCID is unknown to the serving cell it can request the mobile station to decode and report the globally unique GID of the cell to uniquely identify it. This enables neighbour cell relation lists to be established automatically.

The PCIDs are not globally unique, but with careful assignments, they can be locally unique which means that the mobile can report a candidate cell by its PCID, and the serving cell can determine the likely cell if the PCID is listed in the serving cells neighbour cell relation list, and initiate handover to this cell.

When the long term cell size is adjusted, the set of appropriate neighbour cell relations may be different. Some new neighbour cells may be discovered, and some existing neighbour cells may not be needed anymore.

PCID Conflict Detection and Resolution

If a serving cell has two cells A and B in the vicinity with the same PCID, and only A is listed in the cell relation list, then a mobile reporting cell B will be handed over to cell A.

The consequence is most likely a handover failure. If the mobile is also requested to report the global cell identity of cell B, then the serving cell can detect that there is a PCID conflict between these cells, and that PCIDs cannot uniquely identify those cells. Such conflicts need to be resolved. The existence of PCID conflicts are more probable directly after the network has been reconfigured, for example if one or several cells have changed the cell size.

Downlink and Uplink Control Channel Configurations

The coverage of the downlink and uplink control channels is determined by power levels, signal durations and other configurations with the objective to match the service area of the cell. When the long term cell size is reduced, it may be possible to reduce the signalling power or resources while maintaining service area coverage. Similarly, the signalling power and resources may needs to be increased if the cell service area is increased. This is further exemplified by the random access procedure in the next subsection.

Random Access Procedure in LTE

During initial access, the UE seeks access to the network in order to register and commence services. The random access (RA) serves as an uplink control procedure to enable the UE to access the network.

FIG. 2a shows the detailed timing of the basic random-access preamble. The preamble is prefixed with a cyclic prefix (CP) to enable simple frequency domain processing. Its length is in the order of $T_{GP}+T_{DS}$, where $T_{DS}$ corresponds to the maximum delay spread and $T_{GP}$ corresponds to the maximum round trip time. The CP insures that the received signal is always circular (after removing the CP in the RA receiver) and thus can be processed by Fast Fourier Transforms FFTs.

FIGS. 2b to 2d show the extended preamble formats. Format 1 has an extended CP and is suited for cell radii up to approximately 100 km. However, since no repetition occurs this format is only suited for environments with good propagation conditions. Format 2 contains a repeated main preamble and a cyclic prefix of approximately 200 μs. This format supports cell radii of up to approximately 30 km. Format 3 also contains a repeated main preamble and an extended CP. Using a RA opportunity length of 3 ms this format supports cell radii of up to approximately 100 km. In opposite to format 1 format 3 contains a repeated preamble and is therefore better suited for environments with bad propagation conditions.

The Time Division Multiple Access/Frequency Division Multiple Access TDMA/FDMA structure of the Radio access RA opportunities in Frequency Division Duplex FDD is visualized in FIG. 3. Here only one 1.08 MHz band is allocated to RA at each time whereas several bands are possible in case of Time Division Duplex TDD. The RA opportunities always occur at the band edges of the physical uplink shared channel directly adjacent to the physical uplink control channel.

Power control has been agreed for RACH in LTE, see 3GPP TR 36.300, Evolved Universal Terrestrial Radio Access (E-UTRA) and Evolved Universal Terrestrial Radio Access (E-UTRAN); Overall description; Stage 2, V8.2.0:

$$P_{RACH}(N)=\min\{P_{MAX}, P_{O\_RACH}+PL+(N-1)\Delta_{RACH}+\Delta_{Preamble}\}.$$

where $P_{RACH}$ is the preamble transmit power,

N=1, 2, 3, . . . is the RACH attempt number $P_{MAX}$ is the maximum UE power, $P_{O\_RACH}$ is a 4-bit cell specific parameter signalled via BCH with a granularity of 2 dB (difference in maximum and minimum $P_{O\_RACH}$ is 30 dB)

PL is the path loss estimated by the UE $\Delta_{RACH}$ is the power ramping step signaled via BCCH and represented by 2 bits (4 levels) with a granularity of 2 dB $\Delta_{Preamble}$ is a preamble-based offset (format 0-3)

The UE will increase its transmission power until network access is granted. There is typically an upper bound on the number of retransmissions and, thus, number of power increases. The behaviour of the power control depends on the cell size, since the cell-wide uncertainty in the downlink path loss measurements and associated applicability for the uplink increases with cell size.

An important trade-off in any kind of control system is between responsiveness to sudden and abrupt changes, and insensitivity to noise. The latter can be handled by filtering and long data aggregation before considering measurement information inputs. This naturally reduces responsiveness.

Hence, there exist a need for a method and a device that enables an improved control system that is both responsive and insensitive to noise.

SUMMARY

It is an object of the present invention to provide an improved method and apparatus for controlling updating of self-optimizing parameters in a cellular radio system. In particular it is an object of the present invention to reduce or eliminate the problems as described above.

This object and others are obtained by the method and apparatus as set out in the appended claims. Thus, by transmitting a message indicating a change of cell size to a number of affected cells, in particular, neighboring cells. The affected cells receiving such a message can be adapted to use the information in the message when determining self-optimization parameters used for control purposes. Hereby, better response times can be achieved without reducing noise sensitivity.

In accordance with one embodiment, when the cell size of a first cell is changed, this cell indicates the cell size change to all affected cells over relevant interfaces, such as X2/S1 for LTE. Other interfaces will be used for transmitting the message in other communication networks. The information can for example be sent to all or a subset of the neighbour cells. Similarly, a central node can indicate to an affected cell that a cell in the vicinity has changed its cell size. Then an affected cell can use this information in self-optimization for parameters that are related to the cell size in order to make then more responsive.

In accordance with one embodiment the information in the message can comprise only that a change of cell size has occurred. In accordance with one embodiment the information can state that the cell size has decreased or increased. In accordance with one embodiment the information in the message can comprise an estimation of the new cell size. In accordance with one embodiment the information in the message can comprise all or a sub-set of the changed cell parameters for the cell having changed its size.

Using the invention will enable a self-optimization procedure that can be operated at a very low intensity and provide a high degree of stability when no dramatic changes are expected, but can adjust relevant parameters promptly when a significant change has occurred in the vicinity of the cell. Thereby, the cell size related parameters can be adjusted with little delay in order to accommodate the impact from reconfigurations of the neighbouring network elements.

BRIEF DESCRIPTION OF THE DRAWINGS

The present invention will now be described in more detail by way of non-limiting examples and with reference to the accompanying drawings, in which.

DETAILED DESCRIPTION

When a cell has changed its cell size by adjusting a parameter related to the cell size, it signals an indication in a message to its neighbouring cells. This indication may include, but not limited to, one or many of the following:

A cell size change indicator

A cell size change direction indicator (increase/decrease)

A cell size change amount (relative cell change)

If the cell size is measured with respect to a path gain related quantity, the change can be assessed in dB (logarithmic scale) or some fraction (linear scale) or in an absolute scale for example cell specific reference signal power reduced with 10 W.

If the cell size is measured with respect to round trip time of signals, the change can be assessed by a time measure.

A changed cell size parameter, for example.

Reference signal power (pilot power)

Antenna downtilt (maybe separated into mechanical and electrical tilts)

Antenna beam direction

Antenna height

Cell offset

Handover parameter (e.g. time to trigger, filtering, handover margin)

Change duration information

Temporary with a fixed duration.

Temporary with an unknown duration (the return to the previous cell size needs also to be indicated).

Permanent and subsequent cell size changes need to be indicated.

Thus, in one embodiment the informative indication is only indicating that the cell has changed its cell size, while the other alternatives include more information about the actual change of the cell.

Many parameters need to match the cell size, for example to provide a service coverage corresponding to the intended cell size. Mechanisms adjusting such parameters can operate differently depending on whether the parameters are considered to be rather accurate, or if they can be far off from optimal settings.

Directly after deploying a new cell many parameters needs to be adjusted to match the true cell size. It can be relevant with rather short aggregation times of the data, and the algorithm update period can consequently be short in this transient state. On the other hand, for a cell that has been active in a region with no network reconfigurations for a long time, the self-optimization algorithms have found appropriate parameters values corresponding to the true cell size. Few changes are expected and self-optimization can be active more seldom, and aggregation times can be longer in this steady state.

This is an example of the trade-off between ambitions to suppress noise in the aggregated data and to be responsive to abrupt changes and large deviations from the desired performance. The latter can be seen as a state where the self-optimization is more intense, or where the network element is being (re)initiated, while the former can be seen as a steady state where self-optimization is less intense and noise suppression is important. In the high-intensity state, typically extensive information is gathered frequently, while in the low-intensity state, less information is gathered, possibly also less frequently.

Figure 1:
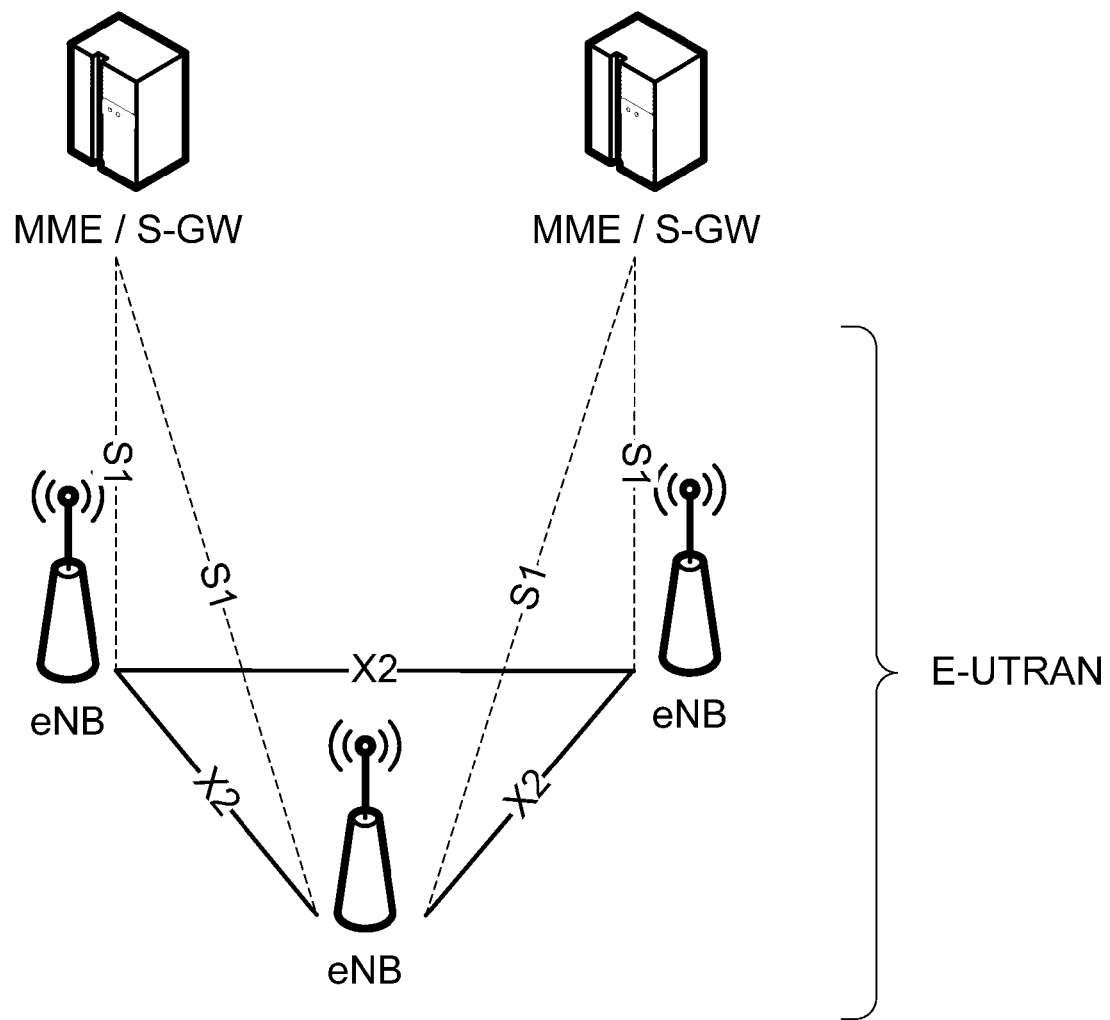
FIG. 1 is a general view of a cellular radio system
Figures 2A, 2B, 2C, 2D:
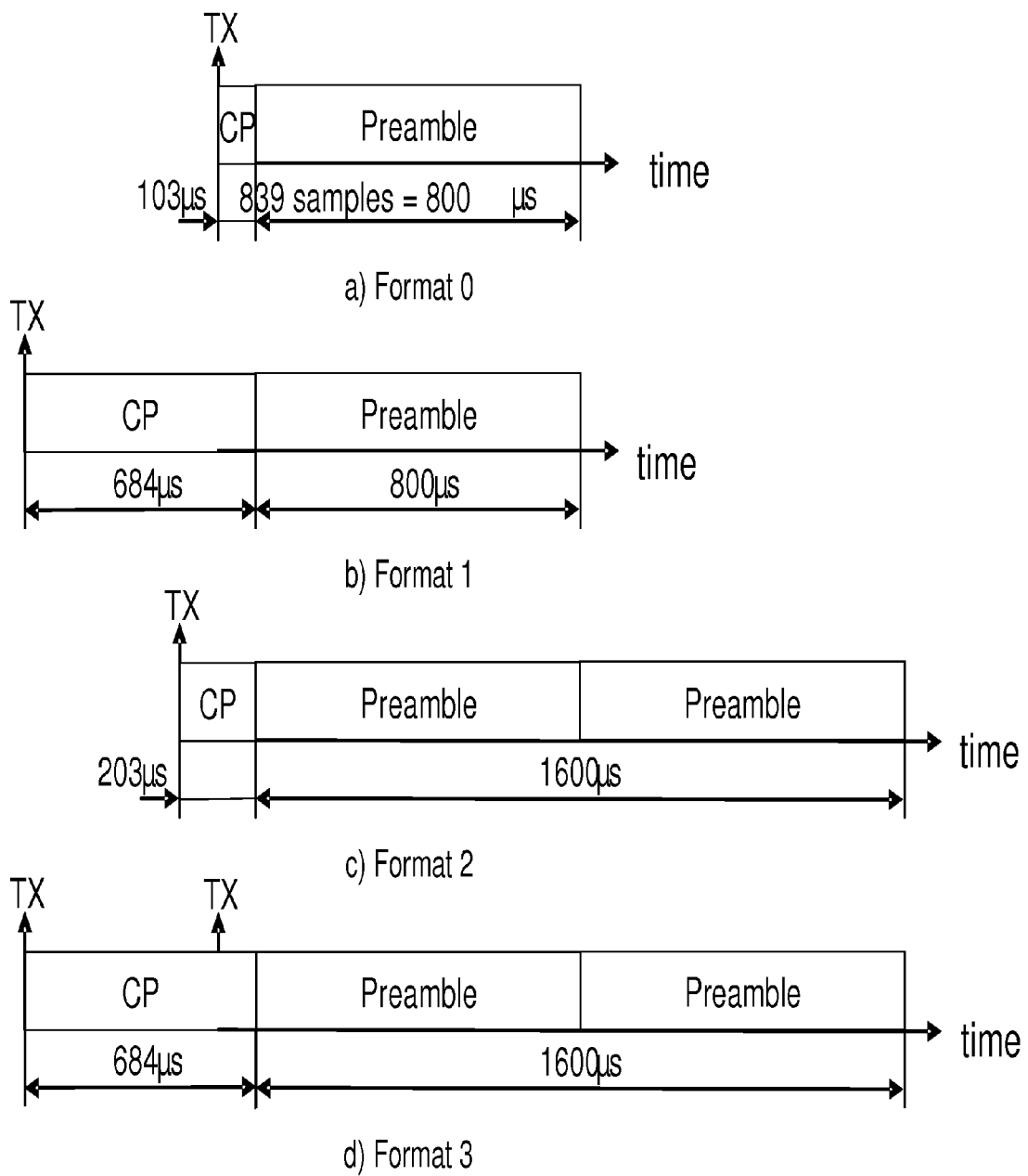
FIGS. 2a-2d shows timing and formats for a random access preamble.
Figure 3:
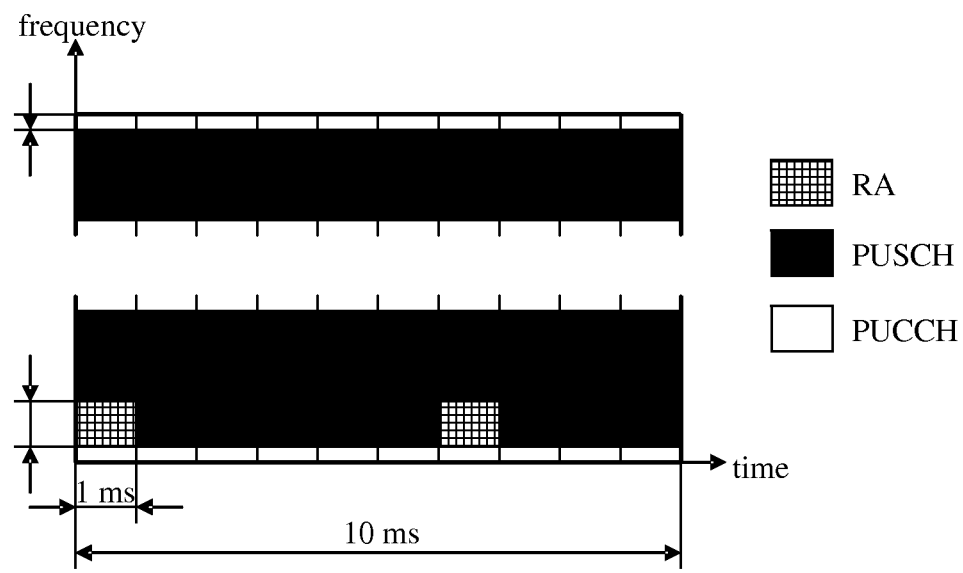
FIG. 3 is a view illustrating radio access opportunities.
Figure 4:
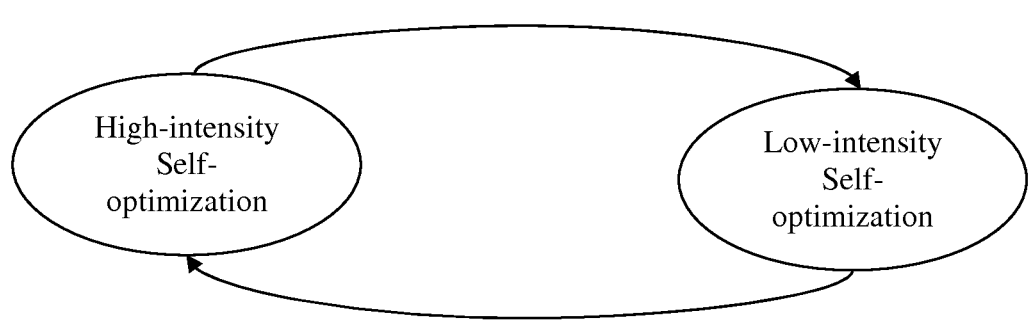
FIG. 4 is a view illustrating different states of running a self-optimization algorithm.

In accordance with one embodiment the reception in a node controlling a cell of a message indication a changed cell size for one of the neighbouring cells can be used to initiate a change of state from a low intensity state to a high intensity state. In FIG. 4 the two states, denoted low-intensity state and high-intensity state are illustrated.

Moreover, several states can be considered to allow a more gradual separation in intensity, and where each state corresponds to a trade-off between responsiveness and noise suppression.

State Transitions

When the, typically long term, cell size of a first cell is changed, this cell indicates the cell size change to all affected cells over a suitable interface such as X2/S1 for LTE. The affected cells can be all neighbouring cells, or a subset of the neighbouring cells, for example determined considering mobility information and statistics, traffic pattern considerations, operator policies etc. Similarly, a central node can indicate to an affected cell that a cell in the vicinity has changed its cell size.

When an affected cell receives an indication that a neighbouring cell has changed its cell size it can trigger a state transition from one state to another state for example from a low-intensity to high-intensity self-optimization state. Thereby, it can promptly adjust parameters related to the cell size and meet the changed cell size.

Furthermore, more information, for example cell size change direction (increase/decrease), cell size change amount, changed cell size parameter can be used as input to the high-intensity state, and when selecting which other state that should be considered in case there are more than two states.

Moreover, if the change duration is indicated to be temporary, a base station receiving a cell size change message can be configured to store the state of the self-optimization before entering the high-intensity state, since that state can be used as an initial state when the temporary change expires.

Figure 5:
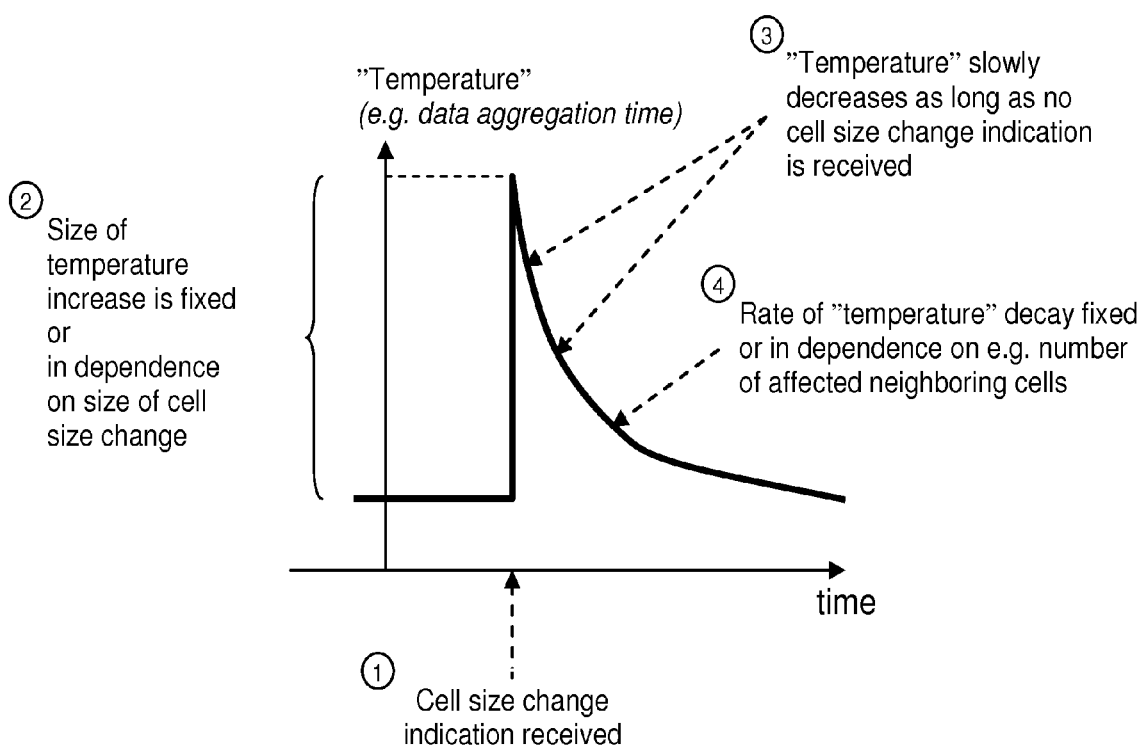
FIG. 5 is a view of a sliding scale for controlling a self-optimizing algorithm.

An alternative embodiment with a simulated annealing approach is shown in FIG. 5. FIG. 5 illustrates the use of a sliding scale. The scale can be viewed as a temperature scale. The "temperature" can for example represent the length of a moving average window or the length of a data aggregation time. When a cell size change indication message is received the temperature jumps up, i.e. the optimization algorithm runs with a higher degree of responsiveness at the cost of a larger noise sensitivity. The temperature, i.e. the optimization algorithm, then slowly decreases as long as no further cell size change notifications are received.

Figure 6:
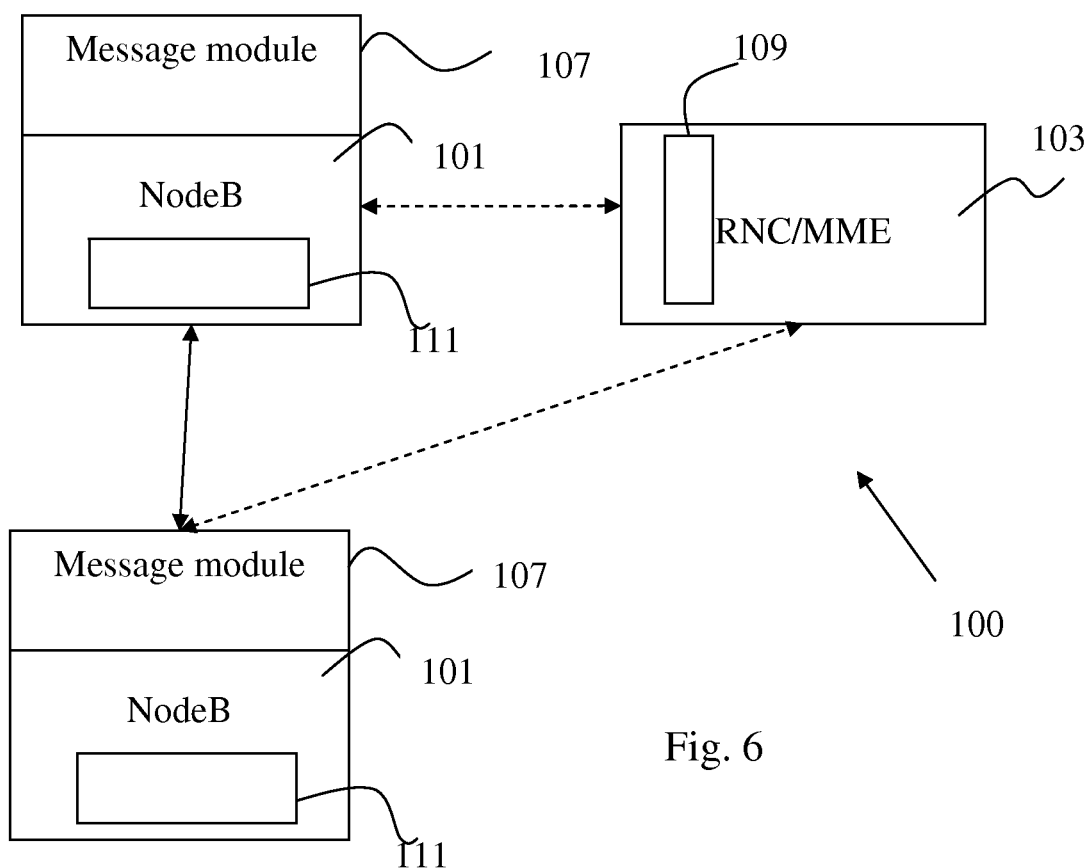
FIG. 6 is a view illustrating a cellular radio system adapted to transmit and receive cell size change messages.

In FIG. 6 a view of an exemplary cellular radio system 100 adapted to transmit and received cell change messages as described above is depicted. The system 100 comprises a number of radio base stations 101. The radio base stations 101 can communicate with each other. The communication between the radio base stations can either be direct, such as over an X2 interface in LTE, or indirect via a central node 103. When a cell of the cellular radio system 100 has changed size a message is initiated and transmitted to some or all neighbouring cells. The message can be formatted in any suitable way as described herein. The message can in accordance with one embodiment be generated in the radio base station changing cell size. In another embodiment the message can be generated in a central node 103.

The radio base stations 101 further comprises a module 107 for transmitting a change in cell size changing parameters to other, typically, neighbouring, radio base stations 101 or to a central node 103. If the system is configured to send cell size change information to a central node, which for example can be the case in a Wideband Code Division Multiple Access (WCDMA) system where the central node 103 would correspond to a Radio network Controller (RNC), the central node will also comprise a message module 109 for (re-) sending the cell size change information to other radio base stations, either directly or via other central nodes. The radio base stations 101 further comprises a module 111 for receiving a cell size change notification message informing of a cell size change in another cell. The module 111 is further adapted to control the intensity with which the self-optimization algorithm is run.

Figure 7:
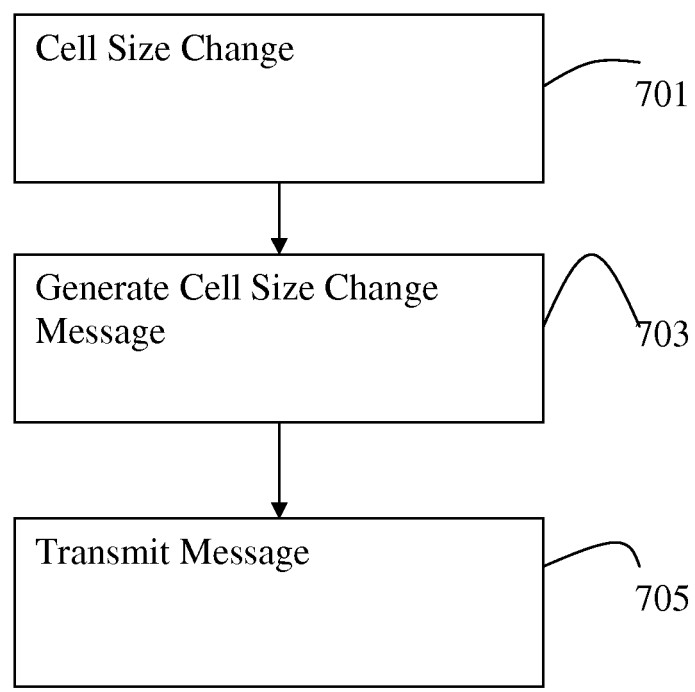
FIG. 7 is a flowchart illustrating some procedural steps performed when transmitting cell size change messages.

In FIG. 7 some procedural steps performed when transmitting a cell size change notification message are depicted. First in a step 701 a change in cell size detected. For example, a change in a parameter affecting the cell size is detected. Next, in a step 703, a message including information about the changed cell size is generated. Next, in a step 705, a message comprising information about a changed cell size in the cell is transmitted. The message will typically comprise a field informing that a change in cell size has occurred and can also comprise information about what cell has changed size. In addition other more detailed information can also be included as set out above.

Figure 8:
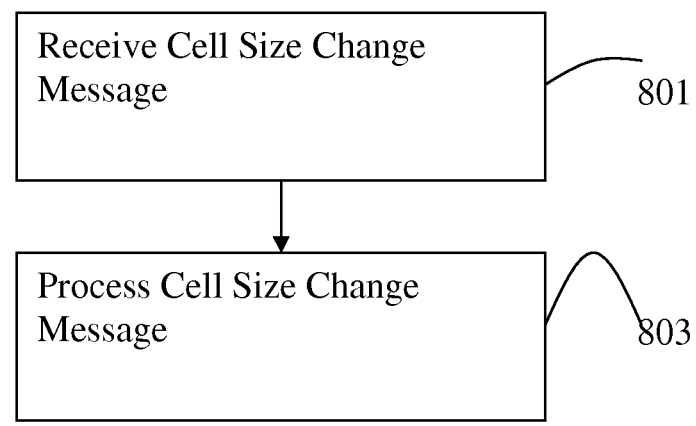
FIG. 8 is a flowchart illustrating some procedural steps performed when receiving and processing a cell size change message.

In FIG. 8 some procedural steps performed when transmitting a cell size change notification message are depicted. First in a step 801 a message notifying a radio base station that another cell, typically a neighbouring cell has changed size is received. Next, in a step 803, the intensity with which the self-optimization algorithm is run is set in response to the received message in step 801.

Below some additional exemplifying embodiments are described. In general, the low intensity state can be entered when the parameters can be considered to correspond well to the cell size, for example when the self-optimization has not changed any parameters within a past predetermined time frame has not changed any parameter by more than a predetermined amount within a past predetermined time frame The high intensity state can be seen as the initialization state, essentially performing a reset of the parameters, possibly using the current parameter values when entering the high intensity state as initial values, or using some general initial values independent of the current parameter values.

Load Balancing

A low-intensity state can correspond to operating short term load balancing with long data aggregation times, for example when estimating the cell load, while a high intensity state can correspond to short aggregation times. Furthermore, if rich indication information is used, the relative cell size change information can be used to directly adjust the short term load balancing parameters accordingly. To exemplify, assume that initially long term load balancing is not active and two neighbouring cells A and B are configured with the same reference signal power. However, short term load balancing has resulted in cell offsets offset_A=0 dB and offset_B=−2 dB. Then, long term load balancing updates the reference signal powers by decreasing the reference signal power level of cell B by 2 dB. If this is included in the cell size change indication, short term load balancing can directly incorporate this change so the new offset of cell B, offset_B is now 0 dB.

Automatic Neighbour Cell Relation Lists

In a low intensity state, a neighbour may need to be reported many times before it is added to the neighbour cell relation list. Similarly, entries in the neighbour cell relation list are removed after being unused for very long periods of time. On the other hand, in a high intensity state, a neighbour need only to be reported few times (e.g. one time) before it is added, and entries in the cell relation list are removed after being unused for shorter periods of time.

PCID Conflict Detection and Resolution

In a low intensity state, few conflicts are expected, and globally unique cell identities are only requested related to a particular PCID after extensive handover failures related to this PCID. Furthermore, globally unique cell identities are not requested regularly. However, in a high intensity state, conflicts are suspected, and globally unique cell identities are requested related to a particular PCID after some handover failures related to this PCID. GIDs can also be requested regularly.

Downlink and Uplink Control Channel Configurations

In a low intensity state, downlink and uplink control channel configurations are fixed, while in a high intensity state, relevant measurements are collected, and the downlink and/or uplink control channel configurations are reconsidered.

Random Access Procedure in LTE

In a low intensity state, data aggregation periods for Random Access Channel (RACH) reconfiguration can be long, while they can be short in a high intensity state. The aggregation periods can be different for different RACH parameter adjustment algorithms.

Furthermore, in a low intensity state, some self-optimizing mechanisms can be disabled, for example selection of format. Also, in a high intensity state, some parameters can be changed to more conservative, wide coverage settings. For example, the format with repeated preambles is selected to enable better coverage while evaluating if the better coverage is needed. Analogously, a format with long cyclic prefix is selected to allow better coverage.

Also, it is noted that some cell size changes are long term, for example via centralized reconfigurations, but decentralized mechanisms can also be considered. These include antenna orientation updates (tilt, azimuth changes, height changes), reference signal power updates, etc. Other cell size changes are short(er) term, typically implemented as distributed mechanisms. These comprise handover offset parameters (e.g. considering a cell specific offset before triggering handover measurement reports). The type of change, long-term or short term, can also be taken into account when transmitting a cell size change message and processing such a message. For example short-term changes can be elected to not be transmitted. Also, if a short-term change message is received the receiving base station may elect to save the old parameter setting to return to when the short-term change returns to its original setting.

The invention claimed is:

1. A method for controlling distributed self optimizing parameters in a base station of a cellular radio system, the method comprising:

receiving a cell size change message via a node-to-node interface of the base station that communicatively couples the base station to another network node in the cellular radio system, and wherein the cell size change message indicates a changed cell size of a first cell in the cellular radio system; and updating the self optimizing parameters in response to the changed cell size of the first cell, including:

triggering a high-intensity state of temporary duration, in response to receiving the cell size change message, and performing said updating of the self optimizing parameters in response to the changed cell size in conjunction with temporarily running a self-optimization algorithm for the base station in the high-intensity state, which is defined by updating one or more of the self optimizing parameters with a higher intensity than used when running the self-optimizing algorithm in a low-intensity state; and reverting to the low-intensity state after the temporary duration of running the self-optimizing algorithm in the high intensity state, wherein the low-intensity state is defined by updating the one or more of the self optimizing parameters at a lower intensity as compared to the updating done in the high-intensity state.

2. The method according to claim 1, wherein receiving the cell size change message comprises receiving the cell size change message from a central node as said other network node, said central node being communicatively coupled to the base station via the node-to-node interface.

3. The method according to claim 1, wherein the cell size change message comprises an indicator indicating at least one of a cell size change indicator indicating a cell size change direction, a cell size change amount, and a cell size parameter, and wherein the method includes updating one or more of the self optimizing parameters according to the indicator.

4. The method according of claim 1, wherein the cell size change message further comprises all or a sub-set of the changed cell parameters for the first cell, and wherein the method includes updating one or more of the self optimizing parameters according to one or more of the all or the sub-set of the changed cell parameters for the first cell.

5. The method according to claim 1, wherein receiving the cell size change message comprises receiving the cell size change message from a second base station as said other network node, and wherein the second base station controls the first cell and is communicatively coupled to the base station via the node-to-node interface.

6. The method of claim 1, wherein said one or more of the self optimizing parameters include one or more of:
- load balancing parameters;
- cell neighbor relation lists;
- physical cell identifiers (PCIDs);
- downlink and uplink control channel parameters; and
- random access procedure parameters for controlling random access on a Random Access Channel (RACH).

7. An apparatus for controlling distributed self optimizing parameters in a base station of a cellular radio system, wherein the base station includes a node-to-node interface coupling the base station to another network node, and wherein the apparatus comprises a module configured to:
- receive a cell size change message via the node-to-node interface, wherein the cell size change message indicates a changed cell size of a first cell in the cellular radio system; and
- update the self optimizing parameters in response to the changed cell size of the first cell, based on said module being configured to:
  - trigger a high-intensity state of temporary duration, in response to receiving the cell size change message, and perform said updating of the self optimizing parameters in response to the changed cell size in conjunction with temporarily running a self-optimization algorithm for the base station in the high-intensity state, which is defined by updating one or more of the self optimizing parameters with a higher intensity than used when running the self-optimizing algorithm in a low-intensity state; and
  - revert to the low-intensity state after the temporary duration of running the self-optimizing algorithm in the high intensity state, wherein the low-intensity state is defined by updating the one or more of the self optimizing parameters at a lower intensity as compared to the updating done in the high-intensity state.

8. The apparatus according to claim 7, wherein the node-to-node interface couples the base station to a central node as said other network node, or to a second base station as said other network node, said second base station related to the first cell, and wherein the module is configured to receive the cell size change message either from the central node or from the second radio base station.

9. The apparatus according to claim 7, wherein the cell size change message further an indicator indicating at least one of a cell size change indicator indicating a cell size change direction, a cell size change amount, and a cell size parameter, and wherein the module is configured to update one or more of the self optimizing parameters according to the indicator.

10. The apparatus according to claim 7, wherein the cell size change message further comprises all or a sub-set of the changed cell parameters for the first cell, and wherein the module is configured to update one or more of the self optimizing parameters according to one or more of the all or the subset of the changed cell parameters.

11. The apparatus of claim 7, wherein said one or more of the self optimizing parameters include one or more of:
- load balancing parameters;
- cell neighbor relation lists;
- physical cell identifiers (PCIDs);
- downlink and uplink control channel parameters; and
- random access procedure parameters for controlling random access on a Random Access Channel (RACH).

* * * * *

UNITED STATES PATENT AND TRADEMARK OFFICE
CERTIFICATE OF CORRECTION

| | | |
|---|---|---|
| PATENT NO. | : 8,934,412 B2 | Page 1 of 1 |
| APPLICATION NO. | : 13/392604 | |
| DATED | : January 13, 2015 | |
| INVENTOR(S) | : Gunnarsson et al. | |

It is certified that error appears in the above-identified patent and that said Letters Patent is hereby corrected as shown below:

In the Specification,

In Column 3, Line 66, delete "then" and insert -- them --, therefor.

In Column 4, Line 24, delete "system" and insert -- system, --, therefor.

In the Claims,

In Column 8, Line 56, in Claim 4, delete "according of" and insert -- according to --, therefor.

In Column 10, Line 13, in Claim 9, delete "further" and insert -- further comprises --, therefor.

Signed and Sealed this
Eighth Day of September, 2015

Michelle K. Lee
*Director of the United States Patent and Trademark Office*